United States Patent [19]

Miyagawa et al.

[11] 3,808,437
[45] Apr. 30, 1974

[54] METHOD OF THICKNESS MEASUREMENT FOR LONG SECTIONS AND APPARATUS THEREFOR

[75] Inventors: Kazuo Miyagawa, Kisarazu; Morihiko Sakakibara; Kazuhiko Kadowaki, both of Himeji; Yasushi Ishikawa, Sagamihara; Takeji Egashira, Himeji, all of Japan

[73] Assignee: Nippon Steel Corporation, Tokyo, Japan

[22] Filed: May 15, 1972

[21] Appl. No.: 253,130

[52] U.S. Cl............... 250/359, 250/360, 250/496, 250/497
[51] Int. Cl. ......................................... G01n 23/02
[58] Field of Search.......... 250/43.5 D, 83.3 D, 358, 250/359, 360, 496, 497

[56] References Cited
UNITED STATES PATENTS 2,525,292  10/1950  Fua et al..................... 250/83.3 D X
3,621,246  11/1971  Horsey et al................ 250/83.3 D X
3,621,259  11/1971  Boissevain................... 250/83.3 D

*Primary Examiner*—Archie R. Borchelt
*Attorney, Agent, or Firm*—Wenderoth, Lind & Ponack

[57] ABSTRACT

A method of thickness measurement for long sections which comprises disposing a collimator containing a radiation source and having a plurality of small holes for passing plural radiation beams so that each of the radiation beams passed through said holes penetrates through one of the elements, such as a web and flanges, of a long section; irradiating the elements of the section with the respective radiation beams at the same time; and individually detecting the intensity of the radiation beam having penetrated through each of the elements of said section.

4 Claims, 8 Drawing Figures

METHOD OF THICKNESS MEASUREMENT FOR LONG SECTIONS AND APPARATUS THEREFOR

BACKGROUND OF THE INVENTION

1. Field of the Invention

The present invention relates to a method of thickness measurement for long sections or shapes and an apparatus for the measurement, and relates more particularly to a method and apparatus for simultaneously and continuously measuring the thickness of a web and flanges constituting a section beam by making use of radioactive rays.

2. Description of the Prior Art

Methods of measuring the thickness of metal plates such as steel plates by utilizing radiation such as bata and gamma rays are widely known in the art.

When this method of thickness measurement by radiations is applied to long H-beams, channel bars and similar long shapes (for example, when the method is employed to measure the thicknesses of the web and flanges of an H-beam of steel), and especially when the method is applied on the transfer line of a production process (such as a rolling process) or an inspection process, there arise a few problems as described hereunder: Since the long section is composed of three dimensional and directional portions such as a web and flanges, a plurality of radiation sources and radiation detectors are required in accordance with the various portions of the sections. As a result, a considerably high equipment cost is necessitated. Moreover, the increased number of radiation sources poses the problem of radiation safety control. Also, according to changes in the configuration and dimensions of the section, it is necessary to change the arrangement of the radiation sources and the radiation detectors. Furthermore, when a bent section is conveyed, the tip of the section may collide with a collimator accommodating a radiation source and may damage the collimator. The latter two problems lead to large distrubances of the smooth line flow in the production process for sections.

Therefore, the method of measuring the thicknesses of the constituent portions of such shapes with the use of radiation has not heretofore been employed on the line of the production process or the inspection process. In its stead method which comprises cutting the sections and the direct thickness measurement by means of hand micrometers has so far been exclusively employed.

However, such direct measuring method with the use of hand micrometers allows only intermittent measurement and requires much time for the measurement, so that the measuring result can not be rapidly fed back to the production line. Thus, the quality and yield of such products can not be largely enhanced. In addition, the conventional direct method requires much labor so that the measuring work is extremely inefficient.

SUMMARY OF THE INVENTION

The present invention obviates the above described problems by providing a method and apparatus for simultaneously measuring the thicknesses of the various elements of a long section by making use of radioactive rays.

This invention contemplates a method of thickness measurement for a long section which is characterized by disposing a collimator containing a radiation source and having a plurality of small holes for passing plural radiation beams so that each of the radiation beams passed through said holes penetrates through one of the elements, such as a web and flanges, of a long section; irradiating the elements of the section with the respective radiation beams at the same time; and individually detecting the intensity of the radiation beam having penetrated through each of the elements of said section.

The invention further contemplates an apparatus for the thickness measurement of long sections which is comprised of a fixed frame, a vertically movable frame which is operably connected to an elevating means mounted on the fixed frame and inside which a long section intended for thickness measurement is passed. An irradiation means is supported by the vertically movable frame to emit a plurality of radiation beams, and a plurality of radiation detectors are arranged on the vertically movable frame. The number of such detectors corresponds to the number of elements, such as a web and flanges, of the long section and are adapted for independent detection of the radiation beams emitted from said irradiation equipment means which have penetrated through one of the elements of said section.

An object of the present invention is to provide a method and apparatus for measuring the thicknesses of the constituent portions of a long section such as a web and flanges continuously, simultaneously, automatically and with high speed and high precision on the transfer line of the production process or the inspection process, without the necessity of cutting the long section.

Another object of the invention is to provide a method and apparatus for measuring the thicknesses of the component portions of a long section simultaneously, economically and safely by the use of a single radiation source.

Still another object of the invention is to provide a method and apparatus for positive simultaneous measurement of the thicknesses of the elements constituting a section which may vary in configuration, dimensions or position, by following the variation.

Still another object of the invention is to provide an apparatus which enables a radiation source to be placed in a housing by remote control when the intended measurement is interrupted, thereby preventing radioactive rays from leaking out.

Still another object of the invention is to provide an apparatus which prevents a moving section intended for thickness measurement from damaging an irradiation means on collision therewith and also intercepts radioactive rays rapidly upon such collision, thereby ensuring safety.

These and other objects of the present invention will be more clearly understood when the following description of a preferred embodiment is read in conjunction with the accompanying drawings.

DESCRIPTION OF THE PREFERRED EMBODIMENT

The section thickness measuring method of the present invention will hereunder be described in detail by reference to the drawings, in which the subject material, or the section, is a steel H-beam.

Figure 1:
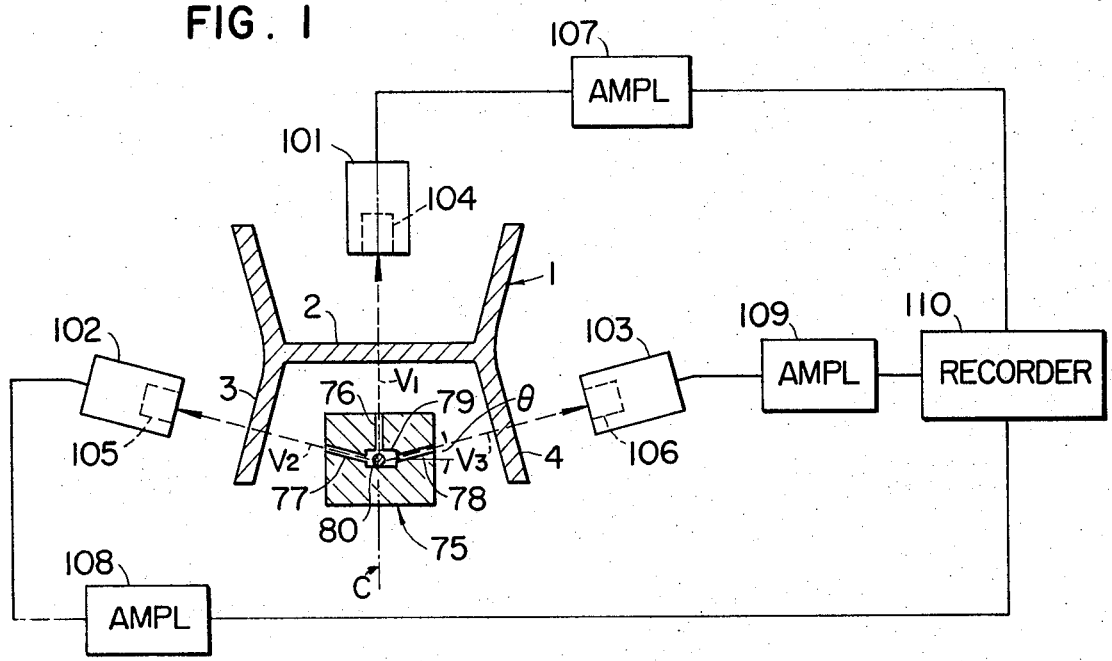
FIG. 1 is a schematic diagram illustrating the method of the present invention and showing a radiation source and radiation detectors which are arranged so as to match the configuration of a steel H-beam.

Reference is now made to FIG. 1. Prior to thickness measurement, a collimator 75 containing a radiation source 80 is disposed near an H-beam 1 of steel on a symmetric axis C of a cross section of the H-beam 1. The collimator 75 is surrounded on its three sides by the web 2 and flanges 3 and 4 of the H-beam 1.

The collimator 75 is made, for example, of a tungsten-lead alloy and has a sufficient thickness to prevent radioactive rays from leaking out. The collimator 75 has a cavity 79, in which the radiation source 80 is placed. The radiation source 80 is, for example, a piece of cesium 137. The collimator 75 has three small holes 76, 77 and 78 having a diameter of about 10 millimeters for the passage of three separate radiation beams $V_1$, $V_2$ and $V_3$. Of the three small holes, the hole 76 is directed vertically while each of the small holes 77 and 78 is opened with an elevation angle of 10 to 20°. Three radiation beams $V_1$, $V_2$ and $V_3$ emitted through the small holes 76, 77 and 78 respectively are small in divergence.

Such disposition of the collimator 75 in relation to the H-beam 1 enables the web 2 and flanges 3 and 4 to be substantially perpendicularly irradiated with the radiation beams $V_1$, $V_2$ and $V_3$ respectively.

It is after the completion of the above described positioning of the collimator 75 that the web 2 and flanges 3 and 4 of the H-beam 1 are exposed to the radiation beams $V_1$, $V_2$ and $V_3$.

The radiation beams $V_1$, $V_2$ and $V_3$ penetrate through the web 2 and flanges 3 and their intensities are 4 and are detected by radiation detectors 101, 102 and 103 such as ionization chambers which are arranged corresponding to the web 2 and flanges 3 and 4 so as to receive the radiation beams $V_1$, $V_2$ and $V_3$, respectively.

The radiation beams $V_1$, $V_2$ and $V_3$ are attenuated in intensity in proportion to the thicknesses of the web 2 and flanges 3 and 4, and the intensities of the attenuated radiation beams are converted into direct current signals by the respective radiation detectors 101, 102 and 103. The signals are amplified by subsequent amplifiers 107, 108 and 109 respectively. Thereafter, a recorder 110 operates to record the thickness of each of the H-beam elements or the difference of the thickness from a reference thickness.

Here follows a typical result of measuring the thicknesses of the constituent members of H-beams of steel in accordance with the method of the present invention:

Radiation source employed  Type: Cs137 (gamma rays)
                           Capacity: 5 Ci
                           Energy: 0.8 Mev
                           Radiation beam: 10 mm dia.
                           Radiation detectors   Ionization chambers
Distance between radiation
source and detector 1,000 mm max.

Table 1 shows the result of the measurement conducted by the method of the present invention in comparison with the result of a practical measurement by micrometer.

Table 1

| Shape steel size | 200 × 200 | | 350 × 175 | | 500 × 200 | |
|---|---|---|---|---|---|---|
| Measuring method | Micrometer | This invention | Micrometer | This invention | Micrometer | This inv. |
| Web | 9.142 | 9.13($\mp$0.03) | 8.023 | 8.05($\mp$0.05) | 11.002 | 11.02 ($\mp$0.06) |
| Flange | 14.126 | 14.11($\mp$0.07) | 12.986 | 13.00($\mp$0.07) | 19.174 | 19.15 ($\mp$0.07) |
| Flange | 14.039 | 14.02($\mp$0.07) | 13.032 | 13.05($\mp$0.07) | 19.092 | 10.11 ($\mp$0.07) |

Note: The unit is the millimeter.

The figures in parentheses represent amplitudes of the pointer needle of the radiation thickness meter.

As apparent from the above shown result, the thickness measuring method of the present invention has a sufficient practical accuracy.

In the thickness measuring method of the present invention, the collimator 75 can be shifted vertically as the dimensions of the subject section vary. For example, when the subject material is an H-beam of steel and if the H-beam is large such as the beam 5 indicated by a dotted line in FIG. 4, the collimator 75 can be lowered to the position 75'. At this time, the distance between the collimator 75 and each of the web 2 and the flanges 3 and 4 or the distances from the web 2 and the flanges 3 and 4 to the respective radiation detectors 101, 102 and 103 change so that the condition in which the radiation beams $V_1$, $V_2$ and $V_3$ are scattered by the H-beam 1 varies. However, this variation exercises a very small influence upon the desired thickness measurement and can therefore be disregarded, or it is possible to compensate adequately for the variation, if necessary. Meanwhile, the angles at which the radioactive rays are directed remain unchanged. Therefore, the vertical shift of the collimator 75 requires the radiation detectors 101, 102 and 103 to be moved vertically integrally with the collimator 75 so as not to change their positions relative to the collimator 75.

Furthermore, even when the configuration of the section varies, the thickness measuring method of the present invention can be applied without the necessity of any modification. For example, when the subject section is a steel channel, simultaneous measurement of the web and flanges is possible as will be easily understood by analogy with the case of the H-beam shown in FIG. 1, that is, by assuming that the upper halves of the flanges 3 and 4 do not exist. Besides, referring to FIG. 2, wherein the subject material is shown as a steel angle member 6, the collimator 75 is positioned so as to suit the angle member 6. On this occasion, the vertical radiation beam $V_1$ is not utilized.

Figure 2:
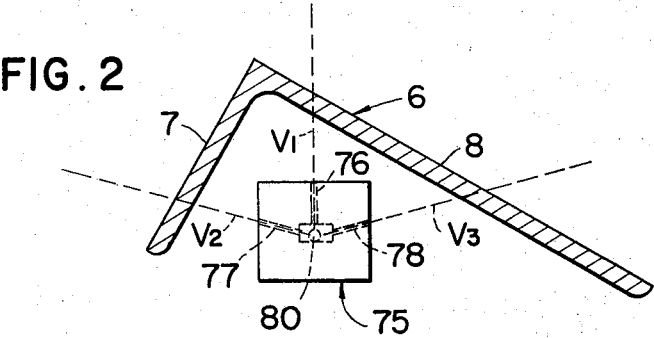
FIG. 2 is a schematic view of a radiation source disposed for a steel angle member.

In FIG. 1, the radiation beams $V_1$, $V_2$ and $V_3$ make substantially right angles of incidence with the web 2 and the flanges 3 and 4 respectively. On the other hand, the radiation beams $V_2$ and $V_3$ shown in FIG. 2 are directed slantwise to the web 7 and the flange 8 respectively. Consequently the measuring apparatus indicates larger thickness values than the real values. The errors can however be easily compensated if the incidence angles of the radiation beams with regard to the subject shape are ascertained.

The radiation beams $V_1$, $V_2$ and $V_3$ having penetrated through the subject material are detected after being passed through iris diaphragms 104, 105 and 106 located just in front of the respective radiation detectors 101, 102 and 103 so that only the portion of each radiation beam which is within a fixed solid angle is detected. This serves for preventing scattered radioactive rays from entering the radiation detectors 101, 102 and 103 from the ambient space, thus enhancing the accuracy of the thickness measurement.

In the heretofore described embodiment, the radiation source 80 is positioned just below the section 1. It is however a matter of course that the radiation source 80 can be located right above the section 1.

Figure 3:
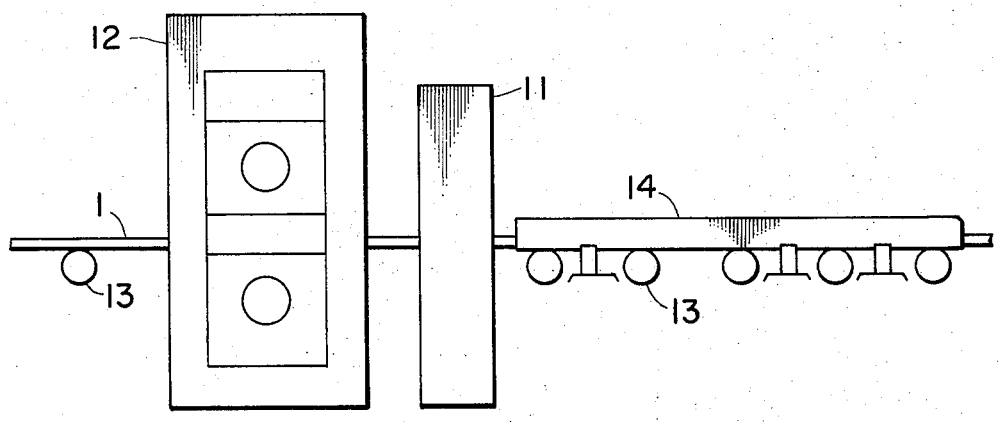
FIG. 3 is a side view schematically showing the thickness measuring apparatus of the present invention installed on line at the rear of an edging mill.

The above described thickness measuring method of the present invention can be practiced on a production line, for example, on a rolling line as shown in FIG. 3. In the same figure, a thickness measuring apparatus 11 (which will later be described in detail) is installed on the outlet side of an edging mill 12. The section 1 is advanced on a roller table 13, guided by a guide 14. On the way, the section 1 passes through the thickness measuring apparatus 11, where the thicknesses of the web and flanges are measured. The result of the measurement is immediately fed back to a roughing-down mill or edging mill in the preceding stage to adjust the rolling conditions. Thus, the thickness measuring method of the present invention can be practiced automatically and continuously so that the method contributes greatly to the improvement of the product quality.

Here follows a description of a thickness measuring apparatus for long shapes which enables efficient and safe practice of the heretofore described section thickness measuring method of the present invention.

The thickness measuring apparatus 11 of the invention comprises such main components as a fixed frame 21, a vertically movable frame 41, an irradiation means 61 and radiation detectors 101, 102 and 103.

Figure 4:
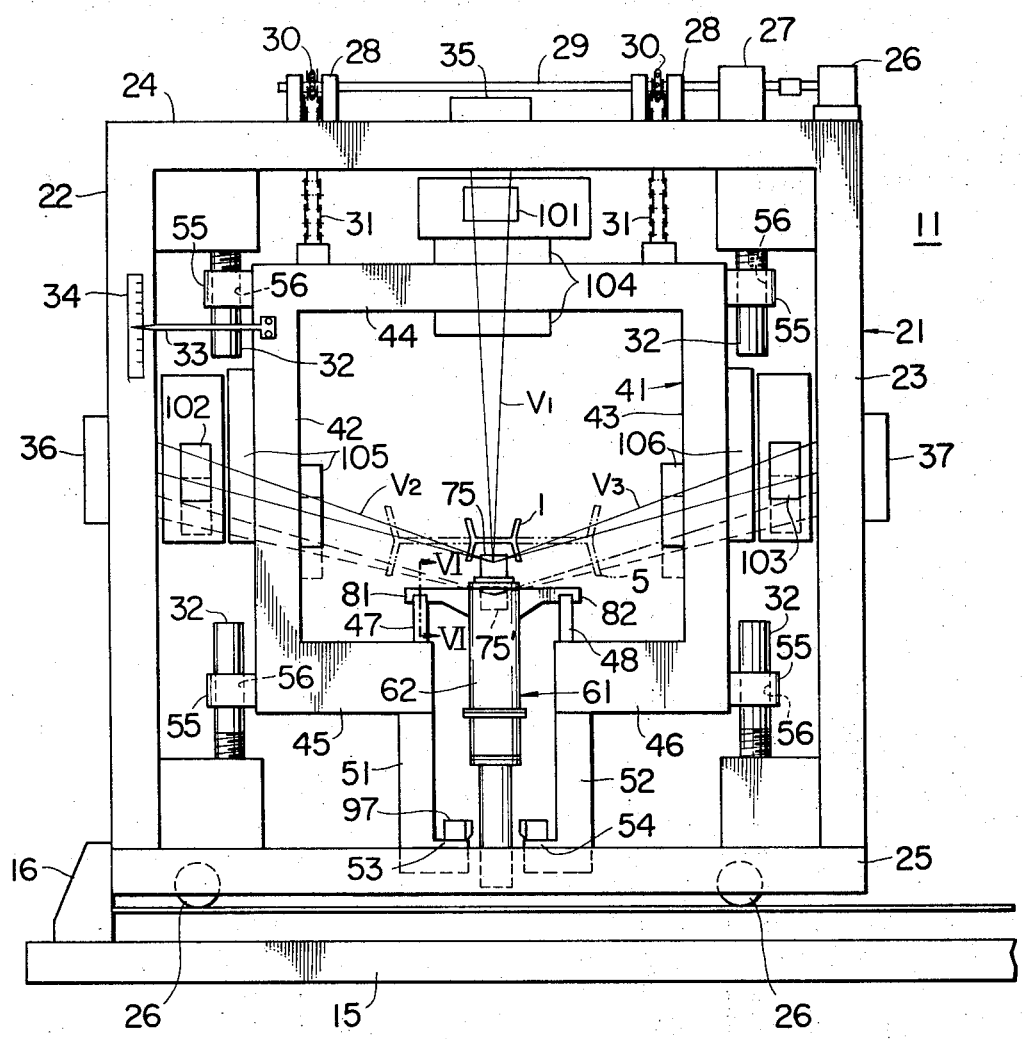
FIG. 4 is a front view of a thickness measuring apparatus embodying the present invention.

As shown in FIG. 4, the fixed frame 21 is composed of two vertical members 22 and 23 and two horizontal members 24 and 25, the ends of which are connected to those of the vertical members in such a manner that all these members form a square frame opening in the direction of advance of the subject material 1.

A motor 26 is fastened on the top right surface of the upper horizontal member 24. The output of the motor 26 is transmitted through a reduction gear 27 to a drive shaft 29 supported by bearings 28. Chain wheels 30 are secured to the drive shaft 29, and chains 31 are hung from the chain wheels 30. The chains 31 are provided for suspension of the vertically movable frame 41, which will be described later, from the fixed frame 21.

The lower horizontal member 25 is equipped with wheels 26, through which the thickness measuring apparatus 11 is mounted on rails 15 laid at right angles with the direction of advance of the subject material 1. A stopper 16 is provided at the left ends of the rails 15. When no thickness measurement is intended, it is possible to move the thickness measuring apparatus 11 to the right out of the rolling line.

The vertically movable frame 41 comprises two vertical members 42 and 43, an upper horizontal member 44 and lower horizontal members 45 and 46, all of which form a square frame opening in the direction of advance of the subject material 1 similar to the fixed frame 21, which surrounds the vertically movable frame 41.

The upper horizontal member 44 is connected with the chains 31 hung from the fixed frame 21 so that the vertically movable frame 41 is suspended within the fixed frame 21. By driving the motor 26, the vertically movable frame 41 is vertically moved through the chains 31 inside the fixed frame 21. A guide member 55 having a shaft hole 56 is secured to each of the upper and lower end portions of the vertical members 42 and 43 of the vertically movable frame 41. On the other hand, a guide shaft 32 is fastened to the fixed frame 21 at each of the four corners inside the fixed frame so as to project upwardly or downwardly. The four guide shafts 32 are fitted in the corresponding shaft holes 56 of the guide members 55 and serve as guide when the vertically movable frame 41 is moved vertically, thereby preventing the vertically movable frame 41 from horizontal swing.

The lower horizontal members 45 and 46 project inwardly from the lower ends of the vertical members 42 and 43 respectively so as to be opposed to each other.

Figure 6:
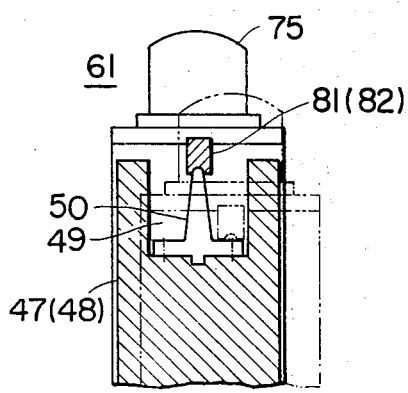
FIG. 6 is an enlarged cross section taken along the line VI—VI of FIG. 4.
Figure 7:
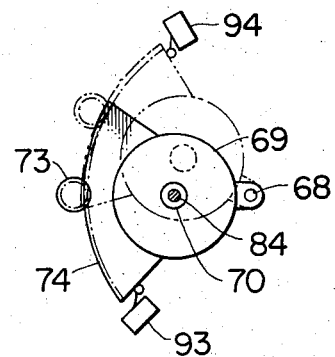
FIG. 7 is a plane view of a shutter as viewed from the line VII—VII of FIG. 5.

The lower horizontal members 45 and 46 are provided respectively with struts 47 and 48 fastened on the tops of the opposed ends of the horizontal members to support the irradiation means 61, which will be described hereinafter. Each of the struts 47 and 48 has a recess 49 formed in the head as shown in FIG. 6, and a support rod 50 is erected in the center of the recess 49. The lower horizontal members 45 and 46 hold suspension arms 51 and 52 respectively which extend downwardly from the bottoms of the opposed ends of the horizontal members.

The suspension arms 51 and 52 are provided at the lower ends thereof with projections 53 and 54 respectively which extend inwardly toward each other. A vibration detector 97, which will be described later, is firmly attached to the projections 53 and 54.

Figure 5:
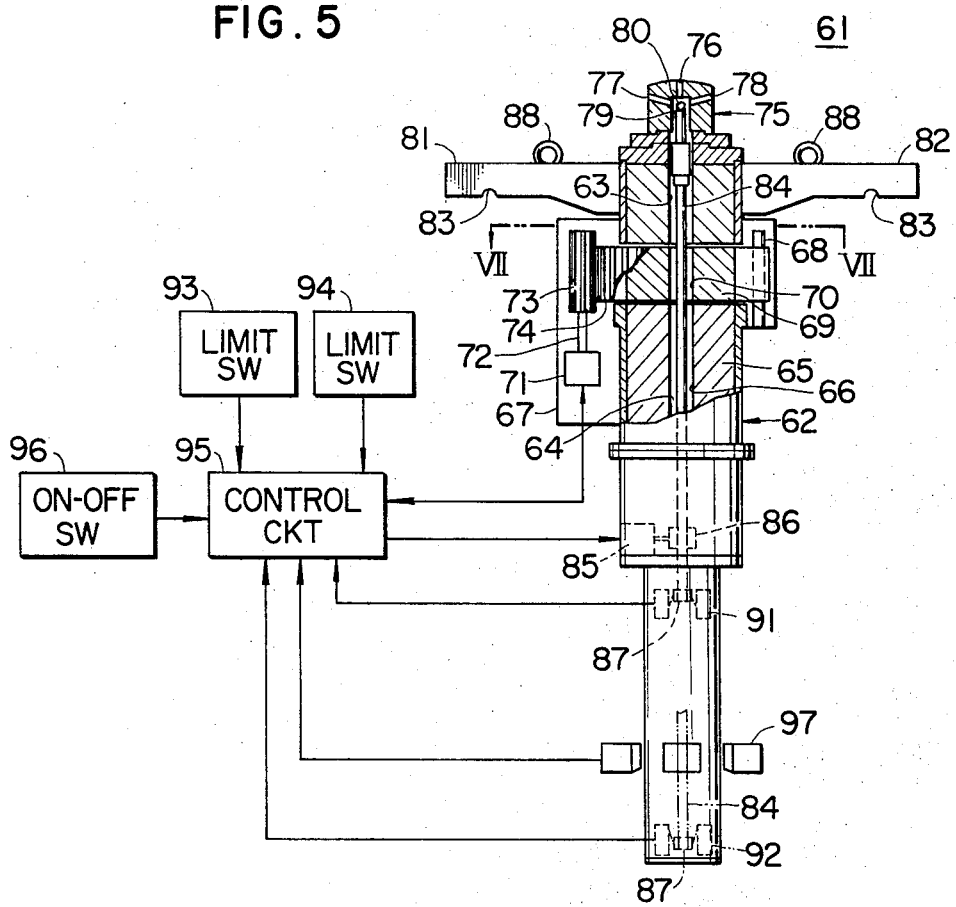
FIG. 5 is an enlarged view, partly broken away, of an irradiation means included in the apparatus shown in FIG. 4.

The irradiation means 61 has a cylindrical main body 62 as shown in FIG. 5. In the center of the body 62 there is a radiation scource housing chamber 64 surrounded by a thick wall 65 which is made of lead, for example, and has a sufficient radiation shielding effect.

The main body 62 is equipped with a bracket 67 outside the body portion in the vicinity of the radiation source housing chamber 64. A shaft 68 is secured to the bracket 67. A thick shutter 69 which is made of lead, for example, and has a sufficient radiation shielding effect is mounted horizontally rotatably on the shaft 68 to close the upper end of the opening 66 of the radiation source housing chamber 64.

The bracket 67 carries a motor 71 having an output shaft 72, to which a pinion 73 is securely attached. The pinion 73 engages a sector gear 74 fastened to the periphery of the shutter 69.

At the top of the main body 62 there is mounted the collimator 75 having the three small holes 76, 77 and 78 as already described. The collimator 75 has a cavity 79 communicating with a hole 63 made in the body 62. A radiation source 80 is located in the cavity 79. Each of the small holes 77 and 78 has an elevation angle of 10 to 20° so that it is possible to direct radioactive rays somewhat obliquely upwardly toward the opposed side portions of the section, that is, the flanges 3 and 4 shown in FIG. 1. Therefore, even when the width of the flanges 3 and 4 is small, the collimator 75 will not come into contact with the web 2. Thus, even a section having relatively small dimensions can be subjected to thickness measurement.

Support arms 81 and 82 extending in horizontally opposite directions are fastened to the upper portion of the main body 62 carrying the collimator 75 at the top thereof as already described. Each of the support arms 81 and 82 has a recess in the substantially central portion thereof. The recesses 83 receive the tips of the support rods 50 carried by the struts 47 and 48, so that the main body 62 is rockably supported on the vertically movable frame 42 through the struts 47 and 48 so as to be capable of falling off.

The radiation source 80 is mounted on the top end of a retaining rod 84 equipped with a rack (not shown). On the other hand, a pinion 86 to be driven by a motor 85 is fitted to the main body 62 below the radiation source housing chamber 64. The pinion 86 is in engagement with the above-mentioned rack. Driven by the motor 85, the retaining rod 84 moves up and down in the body 62 so that the radiation source 80 moves to the upper extreme position in the cavity 79 of the collimator 75 and to the lower extreme position in the radiation source housing chamber 64.

Limit switches 91 and 92 are provided in the main body 62 somewhat below the motor 85 and at the lower and of the body 62, respectively, and operate when they contact contactor 87 attached to the bottom end of the retaining rod 84. Also, limit switches 93 and 94 are fastened to the bracket 67 so as to come into contact with the sector gear 74 when the shutter 69 is brought into the open and closed positions, respectively. All of these limit switches 91, 92, 93 and 94 are electrically connected to a control circuit 95, which is mainly composed of relays and electromagnetic switches. The control circuit 95 delivers output signals to start and stop the shutter driving motor 71 and the motor 85 for driving the radiation source retaining rod 84.

Here follows a description of the controlling operation for the vertical movement of the radiation source 80. When radiation source 80 is set-in the housing chamber 64, the shuter is closed. It is now assumed that, under this condition, the opening push-button of a shutter control switch 96 electrically connected to the control circuit 95 is depressed. Then a signal is transmitted to the control circuit 95 and causes the motor 71 to open the shutter 69 so that a hole 70 made in the shutter 69 agrees with the hole 63 of the main body 62 and the hole 66 of the housing chamber 64, thus forming therewith a single through hole. When the shutter 69 has been fully opened, the opening-side limit switch 93 operates to start the motor 85 with the result that the radiation source retaining rod 84 rises up. When the radiation source 80 has come into the cavity 79 of the collimator 75, the upper limit switch 91 operates to stop the motor 85.

When it is intended to place the radiation source 80 in the housing chamber 64, the closing push-button of the shutter control switch 96 is depressed. This causes the motor 85 to start and lower the radiation source retaining rod 84. Just when the radiation source 80 has been housed in the housing chamber 64, the lower limit switch 92 operates to stop the motor 85. At the same time, the motor 71 starts to close the shutter 69. As soon as the shutter 69 is fully closed, the closing-side limit switch 94 operates to stop the motor 71.

It is possible to provide a limit switch instead of the contactor 87 of the radiation source rod 84, and contactors in place of the upper and lower limit switches 91 and 92. Furthermore the shutter control switch 96 can be manually operated or operably connected with a section transfer detector fitted to a rolling mill.

As shown in FIG. 4, the radiation detectors 101, 102 and 103 for detecting radioactive rays having passed through the section under measurement are fastened to the outside of the vertically movable frame 41 through the iris diaphragms 104, 105 and 106 so as to catch the three radiation beams $V_1$, $V_2$ and $V_3$ emitted from the collimator 75, respectively. Since the irradiation means 61 is supported on the vertically movable frame 41 as described above, the position of the radiation source 80 relative to those of the radiation detectors 101, 102 and 103 remains unchanged even when the vertically movable frame 41 is vertically moved. The irises 104, 105 and 106 are provided for reducing electric signal noises caused by radiation beam divergence and allows only effective beams to get to the radiation detectors 101, 102 and 103. The best suited aperture diameter is determined in view of the size of the radiation detectors and the amount of beam divergence.

A needle pointer 33 is fixed to the upper portion of the vertical member 42 of the vertically movable frame 41. The pointer 33 projects horizontally with its tip reaching the vertical member 22 of the fixed frame 21. A scale board 34 is attached to the portion of the vertical member 22 of the fixed frame 21 which meets the needle pointer 33. The pointer 33 and the scale board 34 serve for setting the radiation source 80 in an adequate position just below the subject material 1. The scale board 34 has graduations for the size of the subject material 1. According to the size of the subject material 1, the vertically movable frame 41 is moved vertically so that the pointer 33 points at the size on the scale board 34.

Shield plates 35, 36 and 37 are affixed to the outsides of the upper horizontal member 24 and vertical member 22 and 23 of the fixed frame 21 at the areas to which the radiation beams $V_1$, $V_2$ and $V_3$ are directed, thus protecting workers from exposure to radioactive rays.

Figure 8:
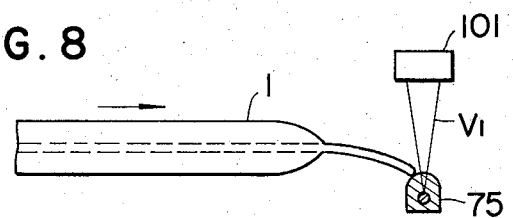
FIG. 8 is a side view illustrating the collision of a section to be subjected to thickness measurement against a collimator.

Reference is now made to FIG. 8. When the subject material 1 is bent or otherwise deformed, the advanced subject material 1 might collide with the collimator 75 and damage the same. The apparatus of the present invention is specially devised to prevent such accident.

That is to say, as described before, the irradiation means 61 is rockably supported on the vertically movable frame 41 through the struts 47 and 48 so as to be able to fall off. Thus, as soon as the subject material 1 collides with the collimator 75, the recesses 83 of the support arms 81 and 82 come off the tips of the support rods 50. Then, as shown in FIG. 6, the support arms 81 and 82 fall down into the recesses 49 of the struts 47 and 48, so that the entire irradiation means 61 falls by about the depth of the recesses 49. Thus, the subject material 1 can not again come into contact with the collimator 75, and therefore the collimator 75 can not be damaged.

When the collimator 75 is displaced as described above, thickness measurement is impossible. In this case, therefore, it is essential to prevent emission of radioactive rays. Otherwise, the radiation may adversely affect the human body.

At the same time as the subject material 1 collides with the collimator 75, the vibration detector 97 mounted on the suspension arms 51 and 52 of the vertically movable frame 41 adjacent the main body 62 of the irradiation means 61 detects the shock due to the collision. The signal delivered from the vibration detector 97 starts the motor 85 with the result that the radiation source retaining rod 84 moves down until the radiation source 80 enters into the housing chamber 64. Then the shutter 69 is closed.

The vibration detector 97 comprises several limit switches or proximity switches arranged around the main body 62.

The fallen irradiation means 61 can be returned to the initial position by a pair of lifting pieces 88 secured to the support arms 81 and 82, so as to raise the irradiation means 61 and to place the same on the support rods 50 received by the struts 47 and 48.

When the thickness measuring apparatus is used for subjecting a hot section to thickness measurement, it is desirable to cool the frames and the irradiation equipment with air, water or the like.

In case cooling is interrupted for some reason, the radiation source in the collimator may be melted by the heat radiated from the subject material. In order to prevent such failure, it is desirable that a temperature detector be disposed near the radiation source to produce a signal in case of an abnormal temperature rise, thereby moving the radiation source into the housing chamber as described before.

It will be understood that other various modifications of the heretofore described thickness measuring method and apparatus for long sections or shapes which embodies the present invention will apear to those skilled in the art and fall within the scope of the appended claims.

What is claimed is:

1. A method of measuring the thickness of a long section comprising the steps of providing a collimator containing a radiation source, causing said collimator to emit a plurality of radiation beams, simultaneously passing each of said beams through a different part of said section, individually detecting with a plurality of detectors the intensity of each of said radiation beams after they pass through their respective different parts of said section, said collimator and said plurality of detectors being adapted to be vertically moved as a unit.

2. An apparatus for measuring the thickness of long sections comprising:
   a. a vertically fixed frame;
   b. a vertically movable frame operably connected to said fixed frame and means mounted on said fixed frame for vertically moving said movable frame, said movable frame having an open space at the inside thereof for allowing said long section to pass therethrough;
   c. irradiation means supported by said vertically movable frame, said irradiation means being adapted to emit a plurality of radiation beams in a plurality of directions transverse to the axis of said long section;
   d. a plurality of radiation detectors mounted on said vertically movable frame, each of said radiation detectors being positioned to detect at least one of said plurality of radiation beams, said radiation detectors and said irradiation means being positioned on opposite sides of said space, whereby when said long section passes through said space, each beam penetrates a different cross-sectional part of said section and each of said plurality of detection means independently detects the radiation penetrating each of said different cross-sectional parts.

3. The apparatus as claimed in claim 2 wherein said irradiation means comprises:
   e. a cylindrical main body having a radiation source housing chamber therein, said chamber being substantially surrounded by a radiation shield for preventing radioactive rays from leaking out;
   f. said chamber having an open end;
   g. a shutter for opening and closing said open end;
   h. a driving device for opening and closing said shutter;
   i. a collimator mounted on the top of said main body and having a plurality of radiation passing holes therein, a cavity in said collimator and a radiation source in said cavity, said cavity communicating with a hole in said main body;
   j. a radiation source retaining rod carrying said radiation source firmly at the top thereof and disposed in said main body so as to be vertically movable;
   k. a driving device for vertically moving said radiation source retaining rod; and
   l. means for detecing the extreme upper and lower movement of said radiation source retaining rod, said detecting means being electrically connected to both said shutter driving device and said driving device for said radiation source retaining rod for controlling the movement of said driving devices.

4. The apparatus as claimed in claim 3 wherein:
   m. said irradiation means is rockably supported on said vertically movable frame so as to be capable of falling therefrom; and
   n. a vibration detector is located adjacent the irradiation means and electrically connected to said driving device for said radiation source retaining rod, whereby when said irradiation means falls, said radiation source retaining rod is lowered until said radiation source enters into said radiation source housing chamber.

* * * * *